US011940267B2

(12) United States Patent
Thones

(10) Patent No.: US 11,940,267 B2
(45) Date of Patent: Mar. 26, 2024

(54) METHOD AND DEVICE FOR MEASURING A TOOTHING OF GEARS OR THE LIKE

(71) Applicant: Klingelnberg GmbH, Hückeswagen (DE)

(72) Inventor: Fabian Thones, Cologne (DE)

(73) Assignee: KLINGELNBERG GMBH, Hückeswagen (DE)

( * ) Notice: Subject to any disclaimer, the term of this patent is extended or adjusted under 35 U.S.C. 154(b) by 0 days.

(21) Appl. No.: 17/588,973

(22) Filed: Jan. 31, 2022

(65) Prior Publication Data

US 2022/0244042 A1 Aug. 4, 2022

(30) Foreign Application Priority Data

Jan. 29, 2021 (DE) ..................... 10 2021 102 122.7

(51) Int. Cl.
*G01B 11/24* (2006.01)
*G01B 11/00* (2006.01)

(52) U.S. Cl.
CPC ........ *G01B 11/2416* (2013.01); *G01B 11/005* (2013.01)

(58) Field of Classification Search
CPC .......................... G01B 11/2416; G01B 11/005
See application file for complete search history.

(56) References Cited

U.S. PATENT DOCUMENTS

| 6,565,418 B1 * | 5/2003 | Feisel ..................... B23F 23/04 451/10 |
| 2013/0133168 A1 * | 5/2013 | Yamaguchi ........ G01B 11/2416 29/284 |
| 2016/0161250 A1 | 6/2016 | Nakamura |
| 2017/0132784 A1 * | 5/2017 | Yamada ................ G06T 7/0006 |
| 2018/0005365 A1 * | 1/2018 | Kimura ............. G01N 21/9515 |
| 2018/0128601 A1 * | 5/2018 | Yamaguchi .............. H04N 7/18 |
| 2020/0200528 A1 * | 6/2020 | Pan ........................ G01B 21/04 |
| 2020/0225027 A1 * | 7/2020 | Landvogt .................. B23F 9/10 |
| 2020/0298362 A1 | 9/2020 | Finkeldey |
| 2020/0368835 A1 * | 11/2020 | Huber .................. G05B 19/406 |
| 2021/0348907 A1 * | 11/2021 | Roithmeier ............ G01B 5/008 |

FOREIGN PATENT DOCUMENTS

DE 102019107188 A1 9/2020
WO WO-2020221818 A1 * 11/2020 .......... G01M 13/021

* cited by examiner

Primary Examiner — Michael P LaPage
(74) Attorney, Agent, or Firm — CANTOR COLBURN LLP

(57) ABSTRACT

A method including the following steps: clamping and centering a toothing on a measuring spindle of a coordinate measuring machine; and measuring a geometry of a toothing using an optical measuring system of the coordinate measuring machine. The toothing is rotated during the measurement by a rotation of the measuring spindle. A rotational speed of the measuring spindle is adjusted and/or increased or decreased depending on a tolerance class of the toothing to be measured.

9 Claims, 3 Drawing Sheets

METHOD AND DEVICE FOR MEASURING A TOOTHING OF GEARS OR THE LIKE

CROSS-REFERENCE TO RELATED APPLICATIONS

This application is related to and claims the benefit of German Patent Application No. 10 2021 102 122.7, filed on Jan. 29, 2021, the contents of which are herein incorporated by reference in their entirety.

TECHNICAL FIELD

The present disclosure relates to a method and device for measuring toothings.

BACKGROUND

Optical measuring systems are becoming increasingly relevant in gear metrology, as they come ever closer to the accuracy of tactile measuring systems and often work much faster than tactile measuring systems. However, the actual potential of optical measuring systems is often not exploited in operational practice.

SUMMARY

Against this background, the present disclosure is based on the technical problem of specifying an improved method and an improved device which, in particular, enable a further reduction in the measuring time or enable optimization of the measuring time on the basis of the specific measurement task.

The technical problem described above is solved in each case by the independent claims. Further embodiments of the disclosure result from the dependent claims and the following description.

According to a first aspect, the disclosure relates to a method comprising the method steps of: clamping and centering a toothing on a measuring spindle of a coordinate measuring machine; measuring a geometry of a toothing by means of an optical measuring system of the coordinate measuring machine, wherein the toothing is rotated during the measurement by a rotation of the measuring spindle. The disclosure is characterized in that a rotational speed of the measuring spindle is adjusted and/or increased or decreased depending on a tolerance class of the toothing to be measured.

Thus, a toothing with a lower quality can be measured with a higher rotational speed of the measuring spindle than a toothing with a higher quality. In this way, a measuring time for the toothing with lower quality can be shortened, since compliance with the required quality can already be verified with a lower measuring accuracy of the optical measuring system. The measuring time can therefore be optimized based on the tolerance class to be inspected.

When reference is made in the present case to a tolerance class or quality of a toothing to be measured, then this relates to a classification of the toothing, e.g. according to one of the standards: ISO 1328, ISO 17485, DIN 3965, ANSI/AGMA.

When reference is made in the present case to the term "measurement of a geometry of the toothing", then this relates in particular to the metrological determination of actual values of one or more geometric parameters of the toothing, such as profile shape, flank shape, number of teeth, outside diameter, tooth pitch, gap width, module, helix angle, spiral angle, tip cone, root cone, tip relief, root relief, end relief, profile crowning, width crowning or the like. For this purpose, for example, individual points and/or profile lines and/or flank lines of tooth flanks of the teeth of the toothing can be measured.

When reference is made in the present case to toothings, this refers in particular to gearwheels of toothed gearings or splines, spur gears, bevel gears or the like.

According to one embodiment of the method, it can be provided that the rotational speed of the measuring spindle is adjusted and/or increased or decreased depending on at least one geometric parameter of the toothing to be measured.

The adaptation of the rotational speed of the measuring spindle can, in particular, be automated on the basis of at least one known nominal value of at least one geometric parameter of the toothing to be measured. This can be, for example, nominal values of one or more geometric parameters of the toothing, such as outer diameter, number of teeth, helix angle, spiral angle, pitch direction, spiral direction, module, tooth pitch, gap width or the like.

For example, it can be provided that both a specified tolerance class of the toothing to be measured and at least one specified nominal value of at least one geometric parameter of the toothing to be measured can be taken into account for determining the rotational speed of the measuring spindle.

According to one embodiment of the method, it can be provided that the rotational speed of the measuring spindle is adjusted and/or increased or decreased depending on at least one sensor parameter of the optical measuring system. When reference is made in this case to a sensor parameter of the optical measuring system, then this can relate, for example, to a scanning frequency of the optical measuring system, a numerical aperture, a measuring resolution or the like.

For example, it can be provided that both a specified tolerance class of the toothing to be measured and at least one sensor parameter of the optical measuring system for determining the rotational speed of the measuring spindle are taken into account.

For example, it can be provided that both a specified tolerance class of the toothing to be measured and at least one specified nominal value of at least one geometric parameter of the toothing to be measured and also at least one sensor parameter of the optical measuring system for determining the rotational speed of the measuring spindle are taken into account.

The specification or determination of a rotational speed of the measuring spindle can, in particular, be carried out in an automated manner by means of a control of the coordinate measuring machine.

The optical measuring system can have a confocal sensor, wherein the geometry of the toothing is detected by confocal distance measurement.

Further, a measurement of a geometry of the toothing can be performed by means of a tactile measuring system of the coordinate measuring machine. The tactile measurement can be used to supplement or verify and/or calibrate the optical measurement system. The tactile measuring system can, for example, have a measuring probe with a sensing ball.

According to a second aspect, the disclosure relates to a method comprising the steps of: measuring a geometry of a first toothing according to a method according to the disclosure described above; measuring a geometry of a second toothing according to a method according to the disclosure described above; wherein the first toothing has a different tolerance class from the second toothing, and wherein the first toothing is measured at a first rotational speed, wherein the second toothing is measured at a second rotational speed, and wherein the first rotational speed is different from the second rotational speed.

For example, the first toothing may have a lower required quality, i.e. a higher tolerance class, than the second toothing, wherein the first toothing is measured at a higher rotational speed.

For example, toothings that have similar dimensions, e.g. in terms of their diameter and module, but differ in their tolerance class, can be measured with an optimized measuring time based on their tolerance class. This is because it is not necessary to utilize the greatest possible measuring accuracy of the optical measuring system for every tolerance class, but rather to measure only as accurately as necessary. This strategy makes it possible to significantly reduce the measuring time, especially for toothings with high tolerance classes, i.e. toothings with lower quality requirements.

According to a third aspect, the disclosure relates to a coordinate measuring machine for measuring toothings, having an optical measuring system for measuring a geometry of a toothing, having a measuring spindle for clamping and centering a toothing to be measured, and having a controller for controlling a measuring sequence, wherein the controller is set up to carry out at least one of the methods of the disclosure described above.

BRIEF DESCRIPTION OF THE DRAWINGS

The disclosure is described in more detail below with reference to a drawing illustrating exemplary embodiments. The drawings each show schematically as follows.

DETAILED DESCRIPTION OF THE DRAWINGS

Figure 1:
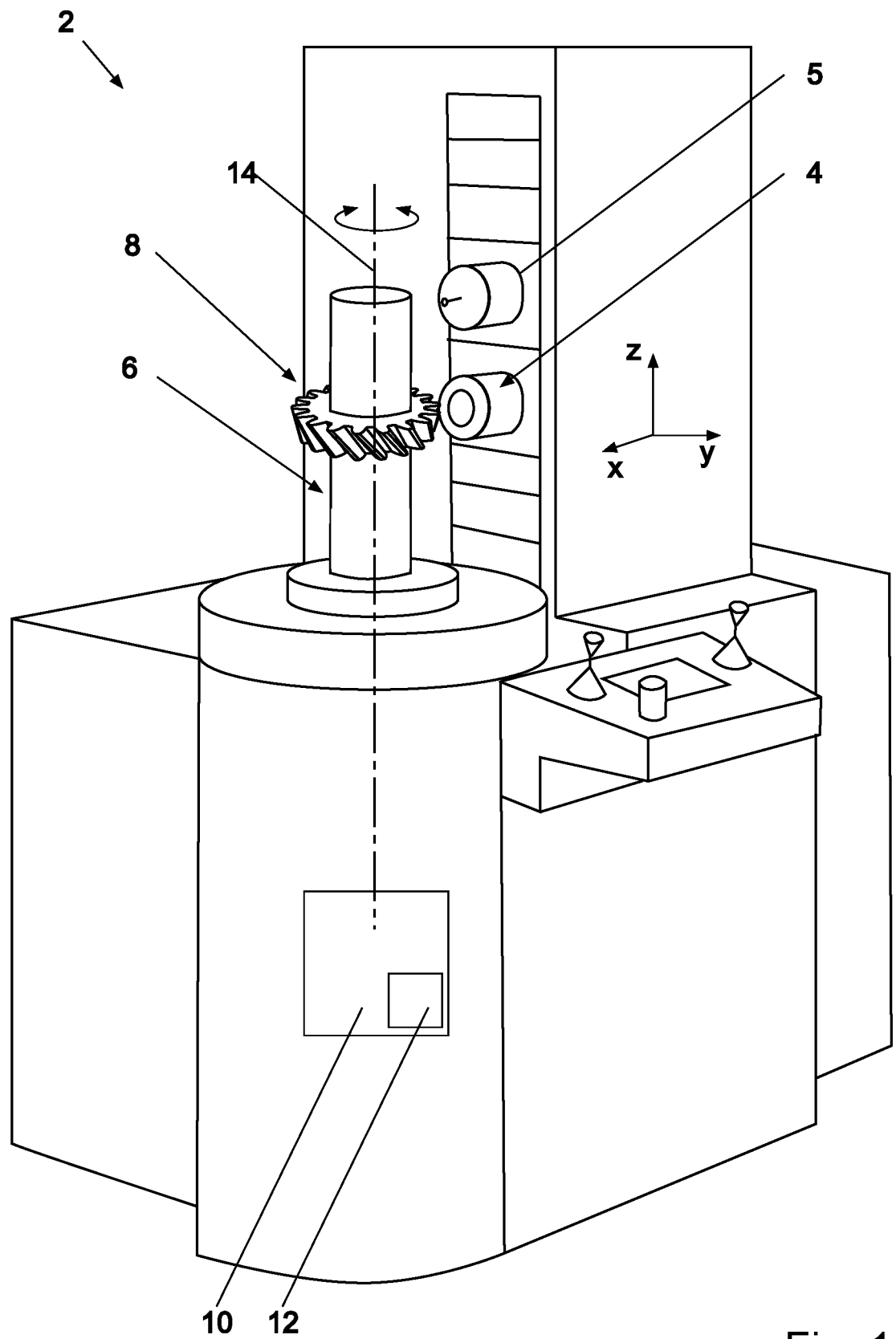
FIG. 1 a coordinate measuring machine according to the disclosure for measuring toothings.
Figure 2:
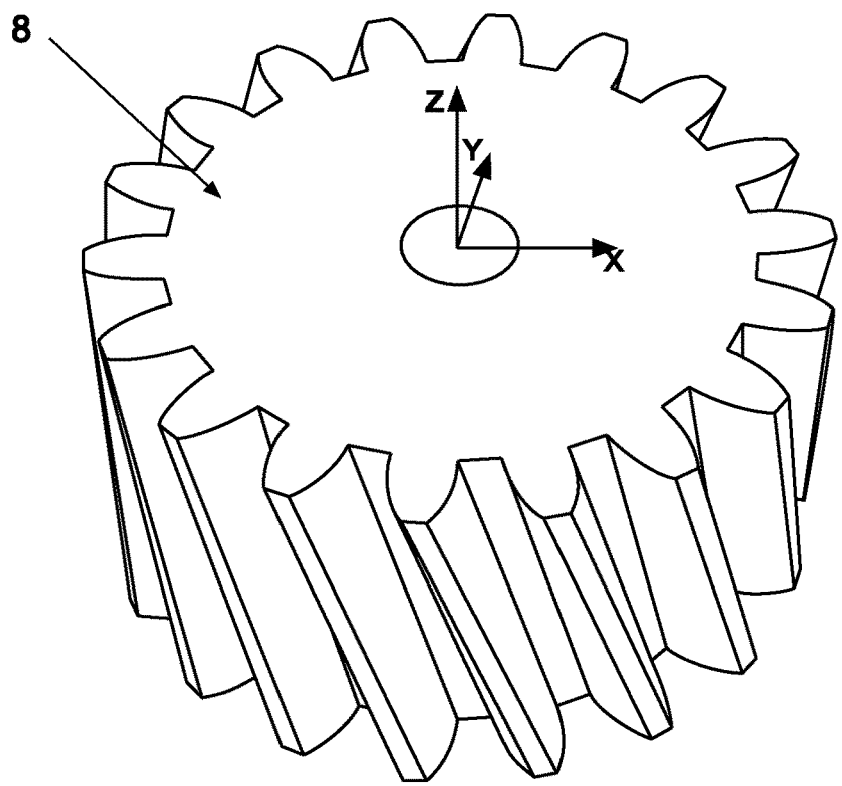
FIG. 2 a toothing to be measured.
Figure 3:
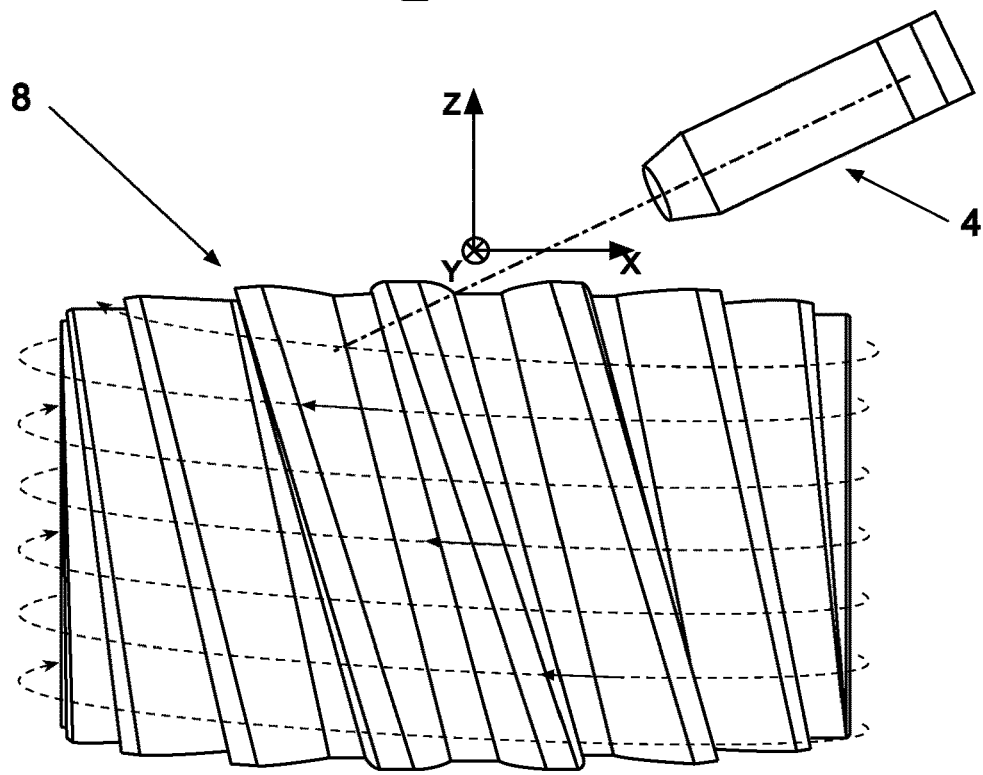
FIG. 3 the toothing to be measured during the measurement.
Figure 4:
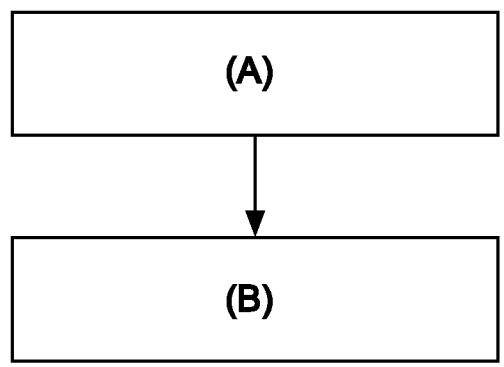
FIG. 4 a process flow.
Figure 5:
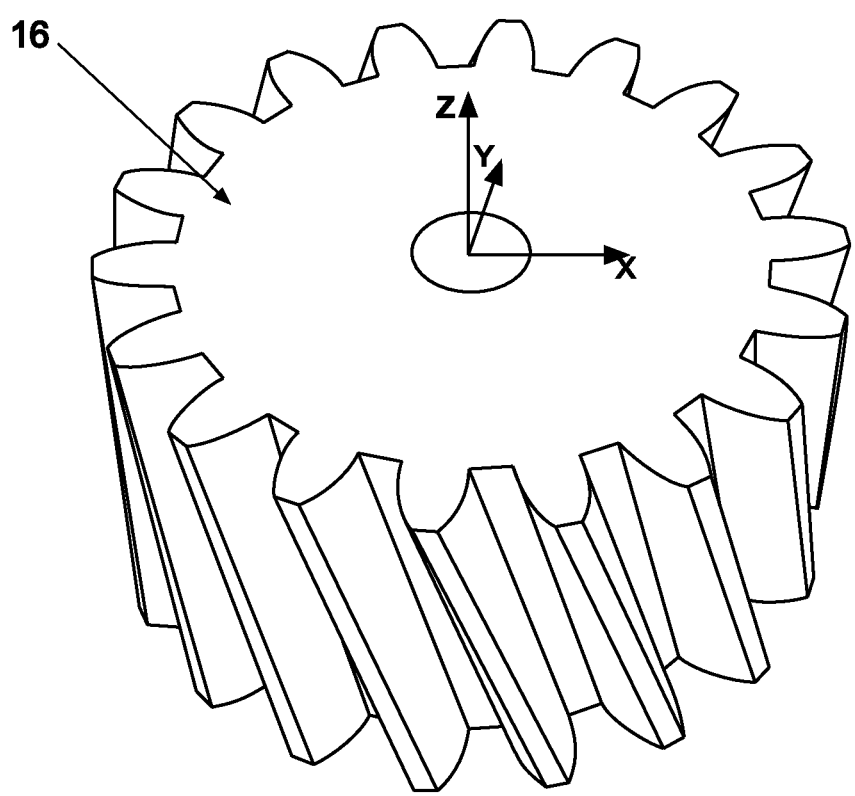
FIG. 5 another toothing to be measured.

FIG. 1 shows a coordinate measuring machine 2 for measuring toothings.

The coordinate measuring machine 2 has an optical measuring system 4 for measuring a geometry of a toothing.

The coordinate measuring machine 2 has a measuring spindle 6 for clamping and centering a toothing 8 to be measured.

The coordinate measuring machine 2 has a controller 10 for controlling a measuring sequence with a data memory 12.

The optical measuring system 4 is a confocal distance sensor 4. In addition, the coordinate measuring machine 2 has a tactile measuring system 5.

The controller 10 is set up to carry out a method described below in accordance with the disclosure.

In a first method step (A), the toothing 8 is clamped and centered on the measuring spindle 6 of the coordinate measuring machine 2.

In a second method step (B), a geometry of the toothing 8 is measured by means of the optical measuring system 4 of the coordinate measuring machine 2, with the toothing 8 being rotated during the measurement by a rotation of the measuring spindle 6. The toothing 8 therefore rotates about a spindle axis 14 of the measuring spindle 6, wherein an axis of rotation of the toothing 8 extends in a collinear manner with the spindle axis 14 or coincides with it.

The spindle axis 14 about which the toothing rotates during the measurement is oriented parallel to a z-axis of the Cartesian coordinate system x-y-z. The optical measuring system 4 can be moved translationally in x-direction and/or in z-direction and/or in y-direction during the measurement.

The coordinate measuring machine 2 therefore has a rotary drive for carrying out the rotation of the spindle 6 and three linear drives for carrying out movements in the x-direction and/or in the z-direction and/or in the y-direction.

A rotational speed of the measuring spindle 6 around the spindle axis 14 is adjusted depending on a tolerance class of the toothing 8 to be measured.

Further, the rotational speed of the measuring spindle 6 is adjusted depending on a maximum outer diameter and a module of the toothing 8 to be measured.

In addition, the rotation speed of the measuring spindle 6 is adjusted depending on a scanning frequency of the optical measuring system 4.

In the present case, the toothing 8 is a first toothing 8, wherein the first toothing 8 is measured with a first rotational speed.

After measuring the first toothing 8, a second toothing 16 having a tolerance class different from the first toothing 8 can be measured according to steps (A) and (B), wherein the second toothing 16 is measured at a second rotational speed and wherein the first rotational speed is different from the second rotational speed.

If, for example, the second gear 16 has a lower nominal quality, i.e. a higher specified tolerance class (e.g. according to ISO 1328), the second toothing 16 can be measured at a higher rotational speed than the first toothing 8. Based on the previous measurement of the first toothing 8, the rotational speed for the subsequent measurement of the second toothing 16 has therefore been increased.

The invention claimed is:

1. A method including the following steps:
clamping and centering a toothing on a measuring spindle of a coordinate measuring machine;
measuring a geometry of the toothing with an optical measuring system of the coordinate measuring machine, wherein the toothing is rotated during the measurement by rotating the measuring spindle;
wherein
a rotational speed of the measuring spindle is adjusted depending on a tolerance class of the toothing to be measured.

2. The method according to claim 1,
wherein
the rotational speed of the measuring spindle
is adjusted
depending on at least one geometric parameter of the toothing to be measured.

3. The method according to claim 2,
wherein the rotational speed of the measuring spindle is increased or decreased depending on at least one geometric parameter of the toothing to be measured.

4. The method according to claim 1,
wherein
the rotational speed of the measuring spindle
is adjusted depending on at least one sensor parameter of the optical measuring system.

5. The method according to claim 4,
wherein the rotational speed of the measuring spindle is increased or decreased depending on at least one sensor parameter of the optical measuring system.

6. The method according to claim 1, wherein
the optical measuring system has a confocal sensor, wherein the geometry of the tootling is detected by confocal distance measurement
and/or
measuring a geometry of the toothing is carried out b means of a tactile measuring system.

7. A method including the following steps:
measuring a geometry of a first toothing and a geometry of a second toothing according to the method recited in claim 1;
wherein the first toothing has a tolerance class which differs from the second toothing, and
wherein the first toothing is measured at a first rotational speed,
wherein the second toothing is measured at a second rotational speed, and
wherein the first rotational speed is different from the second rotational speed.

8. A coordinate measuring machine for measuring toothings,
having an optical measuring system for measuring a geometry of a toothing;
having a measuring spindle for clamping and centering a toothing to be measured, and
having a controller for controlling a measuring sequence,
wherein the controller is arranged to perform a method according to claim 1.

9. The method according to claim 1,
wherein the rotational speed of the measuring spindle is increased or decreased depending on a tolerance class of the toothing to be measured.

* * * * *